(12) United States Patent
Fujimoto et al.

(10) Patent No.: US 8,676,467 B2
(45) Date of Patent: Mar. 18, 2014

(54) SPEED CHANGE CONTROL SYSTEM FOR A VEHICLE

(75) Inventors: Hiroo Fujimoto, Sakai (JP); Issei Tanimura, Osaka (JP); Yoshihiko Kuroshita, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 13/421,158

(22) Filed: Mar. 15, 2012

(65) Prior Publication Data
US 2013/0030667 A1    Jan. 31, 2013

(30) Foreign Application Priority Data

Jul. 29, 2011 (JP) ................................ 2011-167664
Mar. 5, 2012 (JP) ................................ 2012-048288

(51) Int. Cl.
*B60T 8/32* (2006.01)
(52) U.S. Cl.
USPC ............................................. 701/93; 701/50
(58) Field of Classification Search
USPC .......................... 701/50, 79, 93, 110; 123/349
See application file for complete search history.

(56) References Cited

U.S. PATENT DOCUMENTS

| 5,088,043 A * | 2/1992 | Akishino et al. ................. 701/93 |
| 5,592,385 A * | 1/1997 | Katayama et al. ............... 701/93 |
| 6,104,976 A * | 8/2000 | Nakamura ........................ 701/95 |
| 2008/0270001 A1* | 10/2008 | Seto et al. ......................... 701/93 |
| 2010/0121539 A1* | 5/2010 | Price et al. ....................... 701/50 |

FOREIGN PATENT DOCUMENTS

| JP | 2004017912 | 1/2004 |
| JP | 2007016896 | 1/2007 |
| JP | 2008037400 A | 2/2008 |

* cited by examiner

*Primary Examiner* — Mary Cheung
(74) *Attorney, Agent, or Firm* — The Webb Law Firm

(57) ABSTRACT

A speed change control system includes a speed change control section for setting a speed change value of a stepless speed change device; a speed change operational tool for providing the speed change control section with a speed change command the stepless speed change device; a constant speed travel operational device for providing the speed change control section with a changing command for changing a constant speed mode speed change value which is a speed change value at the time of the constant speed mode, a shifting command for shifting to the constant speed mode and a departing command for departing from the constant speed mode; and a constant speed travel management section which causes the speed change control section to execute the constant speed mode with the constant speed mode speed change value, based on the shifting command from the constant speed travel operational device.

5 Claims, 14 Drawing Sheets

SPEED CHANGE CONTROL SYSTEM FOR A VEHICLE

BACKGROUND OF THE INVENTION

1. Field of the Invention

The present invention relates to a speed change control system having a constant speed mode for causing a vehicle to travel at a constant speed, which vehicle includes a stepless speed change device for steplessly speed-changing a rotational power from an engine and outputting the speed-changed power.

2. Description of the Related Art

The constant speed mode for causing a vehicle to travel at a constant speed is called also a cruising mode. This mode is used when a work vehicle such as a tractor carries out a utility work such as a cultivating work, a ground leveling work, etc., while the vehicle travels at a constant speed. With using this constant speed mode, the driver or operator is free from the trouble of vehicle speed adjustment. A work vehicle having such constant speed mode is disclosed in Japanese unexamined patent application publication No. 2008-037400 (JP 2008-037400 A) (paragraphs through [00087], FIG. 6). This work vehicle mounts a hydrostatic stepless speed change device ("HST" hereinafter) as the stepless speed change device and realizes the constant speed travel by maintaining the swash plate angle of a hydraulic pump to a predetermined angle. For this reason, as operational tools for setting a swash plate target operational position as a speed change value for speed change controlling means for operating the swash plate angle of the hydraulic pump, there are provided a constant speed lever having a speed change lever with a friction type position maintaining tool. Of the swash plate target operational position set by the constant speed lever and the swash plate' target operational position set by the speed change lever, one which provides a higher vehicle speed corresponding thereto is set as the actual speed change value for the HST. Therefore, if e.g. the swash plate target operational position set by the constant speed lever is set to the zero speed in advance, the HST will be speed-changed according to an operational amount of the speed change lever, whereby the desired vehicle speed can be obtained. If the constant speed lever is maintained at an operational position for obtaining a predetermined constant travel speed, when the swash plate target operational position set by the speed change lever is lower than the swash plate target operational position set by the constant speed lever (this condition can be easily realized by the operator's keeping his/her foot away from the constant speed pedal thus keeping the pedal free), constant speed traveling of the vehicle at that desired constant travel speed is, made possible.

However, with the constant speed mode control using a constant speed lever which is retained by means of friction, the friction makes accurate setting of a constant vehicle travel speed difficult. Especially, after release of the constant speed mode by lowering the constant speed lever to the zero speed position, it is difficult to set the constant speed mode to the same speed as before.

In view of the above-described state of the art, the object of the present invention is to provide a speed change control system for a vehicle capable of realizing a constant speed travel at a desired speed with a simple operation, with a simple arrangement.

SUMMARY OF THE INVENTION

The above-noted object is fulfilled according to one aspect of the invention as under:—

A speed change control system having a constant speed mode for causing a vehicle to travel at a constant speed, comprising:
  a stepless speed change device for steplessly speed-changing a rotational power from an engine and outputting the speed-changed power;
  a speed change control section for setting a speed change value of the stepless speed change device;
  a speed change operational tool for providing the speed change control section with a speed change command;
  a constant speed travel management section for causing the speed change control section to execute the constant speed mode; and
  a constant speed travel operational device for providing the speed change control section with, as operational commands relating to the constant speed mode, a first operational command for shifting to the constant speed mode with using a current speed change value by the speed change operational tool as a constant speed mode speed change value, and a departing command for departing from the constant speed mode.

With this arrangement, the constant speed travel operational device issues a shifting command for shifting to the constant speed mode for causing the vehicle to travel at a constant speed, and a further command for returning from the constant speed mode to a normal traveling state; and in addition, the speed change value which determines the vehicle speed for the constant speed mode can be adjusted. Therefore, adjustment to a travel speed desired by the driver can be readily realized also during travel in the constant speed mode. In this, if the constant speed travel operational means is constituted of a single constant speed travel operational instrument, the construction of the speed change control system can be simplified.

The above-noted object is fulfilled also according to another one aspect of the invention as under:—

A speed change control system having a constant speed mode for causing a vehicle to travel at a constant speed, comprising:
  a stepless speed change device for steplessly speed-changing a rotational power from an engine and outputting the speed-changed power;
  a speed change control section for setting a speed change value of the stepless speed change device;
  a speed change operational tool for providing the speed change control section with a speed change command;
  a constant speed travel operational device for providing the speed change control section with a changing command for changing a constant speed mode speed change value which is a speed change value at the time of the constant speed mode, a shifting command for shifting to the constant speed mode, and a departing command for departing from the constant speed mode;
  a storage section for storing the constant speed mode speed change value set by the constant speed travel operational device; and
  a constant speed travel management section for causing the speed change control section to execute the constant speed mode with using the constant speed mode speed change value retrieved from the storage section, based on the shifting command from the constant speed travel operational device.

With this arrangement, the constant speed travel operational device issues a shifting command for shifting to the constant speed mode for causing the vehicle to travel at a constant speed; and in addition, the speed change value which determines the vehicle speed for this constant speed mode can be adjusted. Further, the constant speed mode speed change value set at the time of the constant speed mode is stored in the storage section. Hence, if the mode is departed from the constant speed mode and then shifted again to the constant speed mode, the constant speed mode speed change value retrieved from the storage section will be used. Therefore, the vehicle can be caused to travel at the same constant speed as before.

According to one preferred embodiment of the present invention:—
- the constant speed travel operational device is constituted of a single constant speed travel operational instrument, and
- the constant speed travel operational instrument has a changing operational position for providing the speed change control section with the changing command by a predetermined speed change value unit, a shifting operational position for providing the speed change control section with the shifting command for shifting to the constant speed mode, and a departing operational position for providing the speed change control section with the departing command for departing from the constant speed mode.

According to this arrangement, by an operation of a single constant speed travel operational device, not only shifting to and departure from the constant speed mode, but also change of the speed change value of the stepless speed change device, that is, adjustment of the vehicle speed at the time of the constant speed travel are made possible. Therefore, the operations are simplified, and also, the wiring required for the control input signal line is simplified.

According to a more specific preferred embodiment of the above-described constant speed travel operational instrument,
- the constant speed travel operational instrument is capable of operational displacements in one direction and in the other direction, across and relative to a neutral position as a reference point to which the instrument is urgedly maintained,
- a terminal end operational displacement position in the one direction is the shifting operational position,
- a terminal end operational displacement position in the other direction is the departing operational position, and
- a unit operational displacement position to the terminal operational displacement positions in the one direction and the other direction is the changing operational position.

With this arrangement, the shifting to the constant speed mode, the departure from the constant speed mode and increase/decrease adjustments of the vehicle speed in the constant speed mode can be assigned to the two operational directions from the reference point and the two operational positions (operational depths) in the above respective operational directions, respectively.

For instance, if a two-step seesaw type switch is employed, increase of the constant speed travel speed can be realized with a shallow press of the switch in one direction. Shifting to the constant speed mode can be realized with a deep press of the switch in the same one direction. Whereas, decrease of the constant speed travel speed can be realized with a shallow press of the switch in the other direction. Departure from the constant speed mode can be realized with a deep press of the switch in the other direction.

In the present invention, the speed change value which determines the vehicle speed in the constant speed mode is stored in the storage section. In this regard, in general, the constant speed travel speed varies, depending on e.g. the type of utility work, the traveling ground surface condition, etc. Therefore, preferably, the storage section is cleared upon completion of one utility work, and the mode is shifted to the constant speed mode when a predetermined travel speed is obtained in a new utility work and the speed change value at this point is stored in the storage section.

In view of this, according to one preferred embodiment of the present invention:—
- the storage section is cleared in response to an ON operation of a vehicle key switch, and
- when the storage section is under a cleared state, the speed change control section uses a speed change value based on the speed change command from the speed change operational tool as the constant speed mode speed change value.

In a constant speed traveling, the rotational speed of the engine is kept constant, and the speed change value is also kept constant, thereby to keep the vehicle speed constant. And, this constant speed travel will last for a relatively long period. The constant speed travel works include both a work with small engine load and a work with large engine load. Further, during a same utility work, there occurs variation in the engine load depending on the working environment. Then, if the engine rotational speed is reduced when the engine load is small, that is, when there is spare power in the engine, thereby to adjust the speed change value to the speed increasing side to obtain a same constant vehicle speed, this arrangement will achieve improvement in the fuel consumption efficiency. In view of this, according to one preferred embodiment of the present invention, the inventive system further comprises an engine load determination section for determining a low load providing spare in engine power,
- wherein, when the low load is determined at the time of the constant speed mode, the rotational speed of the engine is reduced by a predetermined amount, and the speed change value is changed so as to compensate for the reduction in the engine rotational speed by a rotational speed reducing command and so as to maintain the constant speed of the vehicle.

With this arrangement, there can be realized energy saving constant speed traveling.

In order to provide a certain degree of freedom in the speed which is effected at the time of shifting to the constant speed mode, according to one preferred embodiment of the present invention:—
- the shifting command by the constant speed travel operational device includes:
  - a first operational command for shifting to the constant speed mode with using a current speed change value by the speed change operational tool as the constant speed mode speed change value, and
  - a second operational command for shifting to the constant speed mode with using the constant speed mode speed change value retrieved from the storage section.

Further, as a simple arrangement for realizing adjustment of the constant speed mode vehicle speed as desired at the time of the constant speed mode, according to one preferred embodiment of the present invention:—
- the changing command by the constant speed travel operational device includes:

a fine speed increase adjusting command for executing fine speed increase adjustment of the constant speed mode speed change value;

a normal speed increase adjusting command for executing normal speed increase adjustment which provides a greater speed increase than the fine speed increase adjustment, a fine speed decrease adjusting command for executing fine speed decrease adjustment of the constant speed mode speed change value, and a normal speed decrease adjusting command for executing normal speed decrease adjustment which provides a greater speed decrease than the fine speed decrease adjustment.

The present invention includes also a speed change control system having modified characterizing features of the present invention. For instance:—

A speed change control system having a constant speed mode for causing a vehicle to travel at a constant speed, comprising:

a stepless speed change device for steplessly speed-changing a rotational power from an engine and outputting the speed-changed power;

a speed change control section for setting a speed change value of the stepless speed change device;

a speed change operational tool for providing the speed change control section with a speed change command;

a constant speed travel management section for causing the speed change control section to execute the constant speed mode;

a storage section for storing a constant speed mode speed change value which is a speed change value at the time of the constant speed mode; and a constant speed travel operational device for providing the speed change control section with, as operational commands relating to the constant speed mode, a first operational command for shifting to the constant speed mode with using a current speed change value by the speed change operational tool as the constant speed mode speed change value, a second operational command for shifting to the constant speed mode with using the constant speed mode speed change value retrieved from the storage section, and a departing command for departing from the constant speed mode.

With the above arrangement too, there is realized a predetermined constant speed travel with high degree of freedom with simple operations.

Further, for realizing a constant speed travel with even high degree of freedom with simple operations, the constant speed travel operational device provides the speed change control section with:

a third command for executing fine speed increase adjustment of the constant speed mode speed change value;

a fourth command for executing normal speed increase adjustment which provides a greater speed increase than the fine speed increase adjustment;

a fifth command for executing fine speed decrease adjustment of the constant speed mode speed change value; and a sixth command for executing normal speed decrease adjustment which provides a greater speed decrease than the fine speed decrease adjustment.

In providing the above arrangement, in order to simply the construction of the constant speed travel operational device, the constant speed travel operational device is constituted of a single constant speed travel operational instrument that allows evaluation of at least seven distinct operational states.

For instance, preferably, the constant speed travel operational instrument has four operational switch positions, and wherein at least two levels of operational period are evaluated at each one of the operational switch positions.

According to a more specific preferred embodiment, the constant speed travel operational instrument comprises a seesaw type switch which provides two levels of operational positions in one direction, and further two levels of operational positions in the other direction, across and relative to a neutral position as a reference point to which the instrument is urgedly maintained.

As described hereinbefore, in case the storage section is configured to be cleared in response to an ON or Off operation of a vehicle key switch, the speed change control section may be configured to use the speed change value based on the speed change command by the speed change operational tool as the constant speed mode speed change value. Instead of this, according to a still yet further aspect of the invention, the storage section is constituted of a non-volatile memory whose contents are not cleared at the time of an OFF operation of a vehicle key switch, and the constant speed mode speed change value stored in the storage section is maintained until being rewritten.

With this arrangement, unless the operator intentionally rewrites the constant speed mode speed change value, utility work with the constantly same constant speed mode speed change value, that is, at a same vehicle speed, is made possible.

Other features and their advantageous effects will be apparent upon reading the detail description as under with reference to the drawings.

DETAILED DESCRIPTION OF THE PREFERRED EMBODIMENTS

Figure 1:
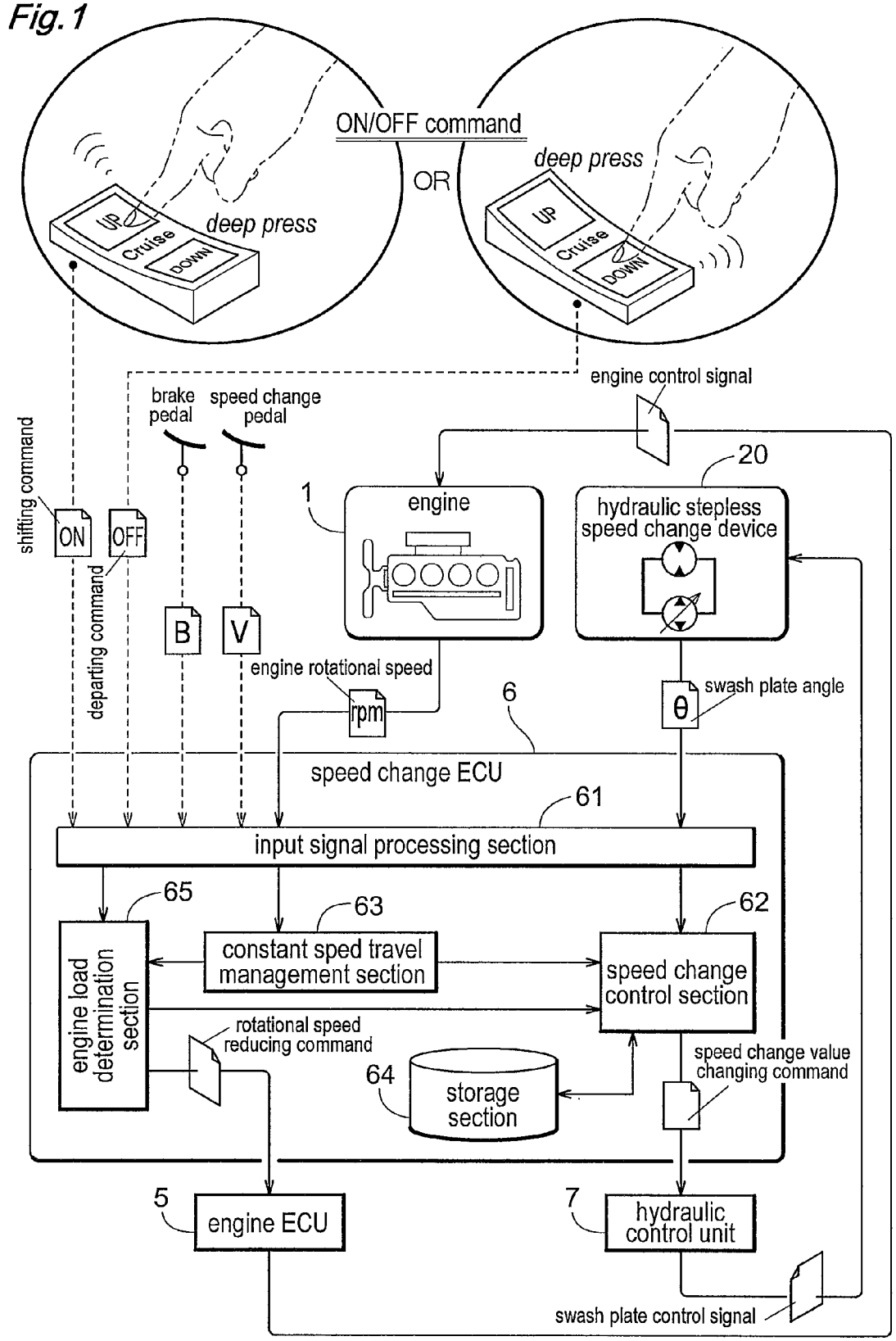
FIG. 1 is a schematic diagram illustrating a control flow of shifting to a constant speed mode and of departing from the constant speed mode in a speed change control system according to the present invention.
Figure 2:
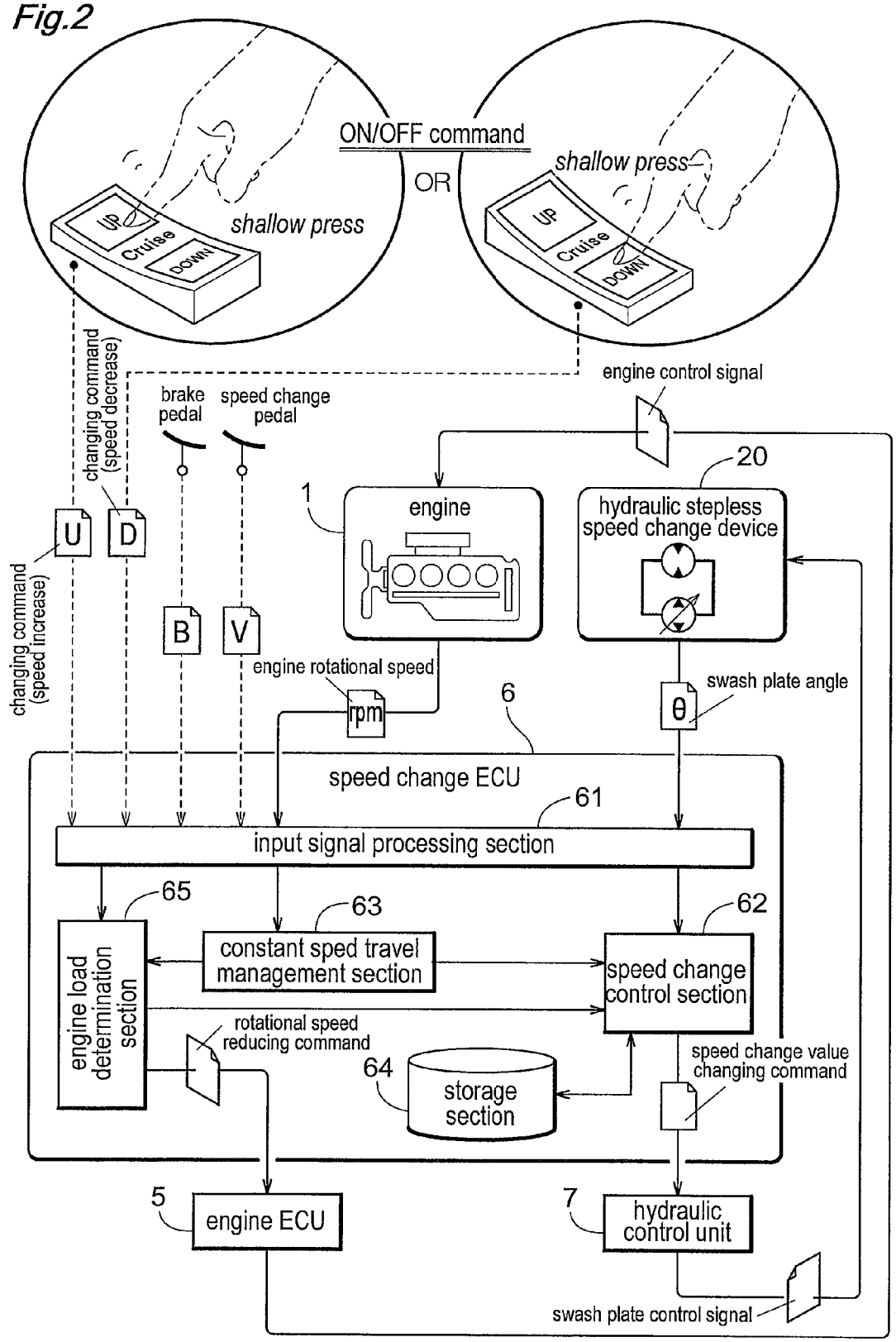
FIG. 2 is a schematic diagram illustrating a control flow of speed increase/decrease of the vehicle speed at the time of the constant speed mode in the speed change control system according to the present invention.

Before giving specific description of embodiments of the present invention, description will be given with reference to FIG. 1 and FIG. 2 on the basic principle of a constant speed mode control for realizing a constant speed vehicle travel by the inventive speed change control system. FIG. 1 is a schematic diagram illustrating a control flow of shifting to a constant speed mode and of departing from the constant speed mode. FIG. 2 is a schematic diagram illustrating a control flow of speed increase/decrease of the vehicle speed at the time of the constant speed mode. Here, as a stepless speed change device, a hydraulic stepless speed change device 20, such as a hydrostatic stepless speed change device (HST) or a hydraulic mechanical stepless speed change device (HMT), is employed. And, a speed change operational tool is constituted of a speed change pedal.

A constant speed travel operational device is constituted of a seesaw type switch 90 ("constant speed switch" hereinafter) as a single constant speed travel operational instrument, having a changing operational position for giving a changing command for changing a predetermined speed change value unit, a shifting operational position for giving a shifting command for shifting to a constant speed mode to a speed change electric control unit (speed change ECU) 6, and a departing operational position for giving a departing command for departing from the constant speed mode. This constant speed switch 90 is capable of operational displacements (pivotal displacements) in one direction (counterclockwise direction) and the other direction (clockwise direction) across and relative to a neutral position as a reference point to which the switch is urgedly maintained by means of a spring or the like. On a press operational face for effecting the operational displacement in the one direction, a mark "UP" is provided. On a press operational face for effecting the operational displacement in the other direction, a mark "DOWN" is provided. The terminal operational displacement position in the one direction is a shifting operational position. When the switch is pressed deeply to this position, a first contact becomes active. Upon this activation of the first contact, an ON signal is given to the speed change ECU 6. This ON signal is treated as a shifting command for requesting shifting to the constant speed mode. The terminal operational displacement position in the other direction is a departing operational position. When the switch is pressed deeply to this position, a second contact becomes active. Upon this activation of the second contact, an OFF signal is given to the speed change ECU 6. This OFF signal is treated as a departing command for requesting departing from the constant speed mode.

This constant speed switch is constructed as a two-level switch in each one of the operational (pressing) directions. Namely, a third contact is formed at a speed increase changing operational position which is set between the terminal operational displacement position and the neutral position in the one direction. Similarly, a fourth contact is formed at a speed decrease changing operational position which is set between the terminal operational displacement position and the neutral position in the other direction. Further, an arrangement is provided such that a click feel is generated at the speed increase changing operational position and the speed decrease changing operational position, respectively. With this arrangement, as shown in FIG. 2, in response to a shallow press operation to the speed increase changing operational position with using the "UP" press operational face of the constant speed switch 90, the third contact becomes active, whereby a speed increase changing command is given to the speed change ECU 6. This changing command provides increase of the unit speed change position, e.g. a speed change value adjustment (swash plate angle adjustment) corresponding to increase of 2 km per hour. Therefore, if the shallow press operation to the speed increase changing operational position is repeated for a plurality of times, there is realized a speed increase corresponding to the number of repetition, within the available range of swash plate angle. Similarly, in response to a shallow press operation to the speed decrease changing operational position with using the "DOWN" press operational face of the constant speed switch 90, the fourth contact becomes active, whereby a speed decrease changing command is given to the speed change ECU 6. This changing command provides decrease of the unit speed change position, e.g. a speed change value adjustment (swash plate angle adjustment) corresponding to decrease of 2 km per hour. Therefore, if the shallow press operation to the speed decrease changing operational position is repeated for a plurality of times, there is realized a speed decrease corresponding to the number of repetition, within the range down to the zero swash plate angle.

The speed change ECU 6 includes an input signal processing section 61 for receiving various commands or signals and transferring them to respective internal functional sections. A speed change control section 62 provides a speed change value changing command to a hydraulic control unit for controlling the swash plate angle of the hydraulic stepless speed change device 20, in order to realize a desired speed change. A constant speed travel management section 63 requests, upon receipt of a shifting command, a shifting to the constant speed mode and requests, upon receipt of a departing command, a departure from the constant speed mode. When the speed change control section 62 receives the shifting command, the section 63 sets a speed of the constant speed travel in the constant speed mode. In this, in case a storage section 64 is storing a speed change value therein, speed change of the hydraulic stepless speed change device 20 is effected with using this speed change value. Whereas, in case the storage section 64 is not storing any speed change value, the current speed change value of the hydraulic stepless speed change device 20 is used for the speed setting for the constant speed travel and this speed change value is stored in the storage section 64.

As may be understood from FIG. 2, if a speed increase changing command is sent from the constant speed switch 90 to the speed change ECU 6, the constant speed travel management section 63 requests the speed change control section 62 a change of the speed change value (speed increase) of the unit speed change value amount. Further, if a speed decrease changing command is sent from the constant speed switch 90 to the speed change ECU 6, the constant speed travel management section 63 requests the speed change control section 62 a change of the speed change value (speed decrease) of the unit speed change value amount. When the speed change control section 62 gives a speed change value changing command to the hydraulic control unit 7, the storage section 64 is caused to store this new speed change value. Therefore, the storage section 64 is to store the current speed change value of the currently ongoing constant speed travel. Incidentally, the speed change value to be stored in the storage section 64 is a value corresponding to a vehicle speed and this does not need to be a value indicative of the actual speed change ratio or the like. This value can be an index for use in determining the vehicle speed through the hydraulic stepless speed change device 20. Further, though not shown in FIG. 1 or FIG. 2, when a vehicle key switch is turned ON or turned OFF, the contents of the storage section 64 will be cleared.

Referring now to departure from the constant speed mode, in addition to the departing command from the constant speed switch 90, a departing command is given to the speed change control section 62 also when an operating for increasing the vehicle speed of the constant speed travel is given through the speed change pedal or when an operation for decreasing the vehicle speed of the constant speed travel is given through a brake pedal. Namely, an operation of the speed change pedal or the brake pedal overrides (or is given priority over) an operation of the constant speed switch 90.

An engine load determination section 65 determines a low load providing the engine with spare power based on engine load information from an engine electric control unit (engine ECU) 5 and preset determination condition. If a low load is determined at the time of the constant speed mode, the engine load determination section 65 reduces the rotational speed of the engine by a predetermined amount and gives such a speed change value to the speed change control section 62 which compensates for the reduction in the reduction in the engine rotational speed due to this rotational speed reducing command.

Figure 3:
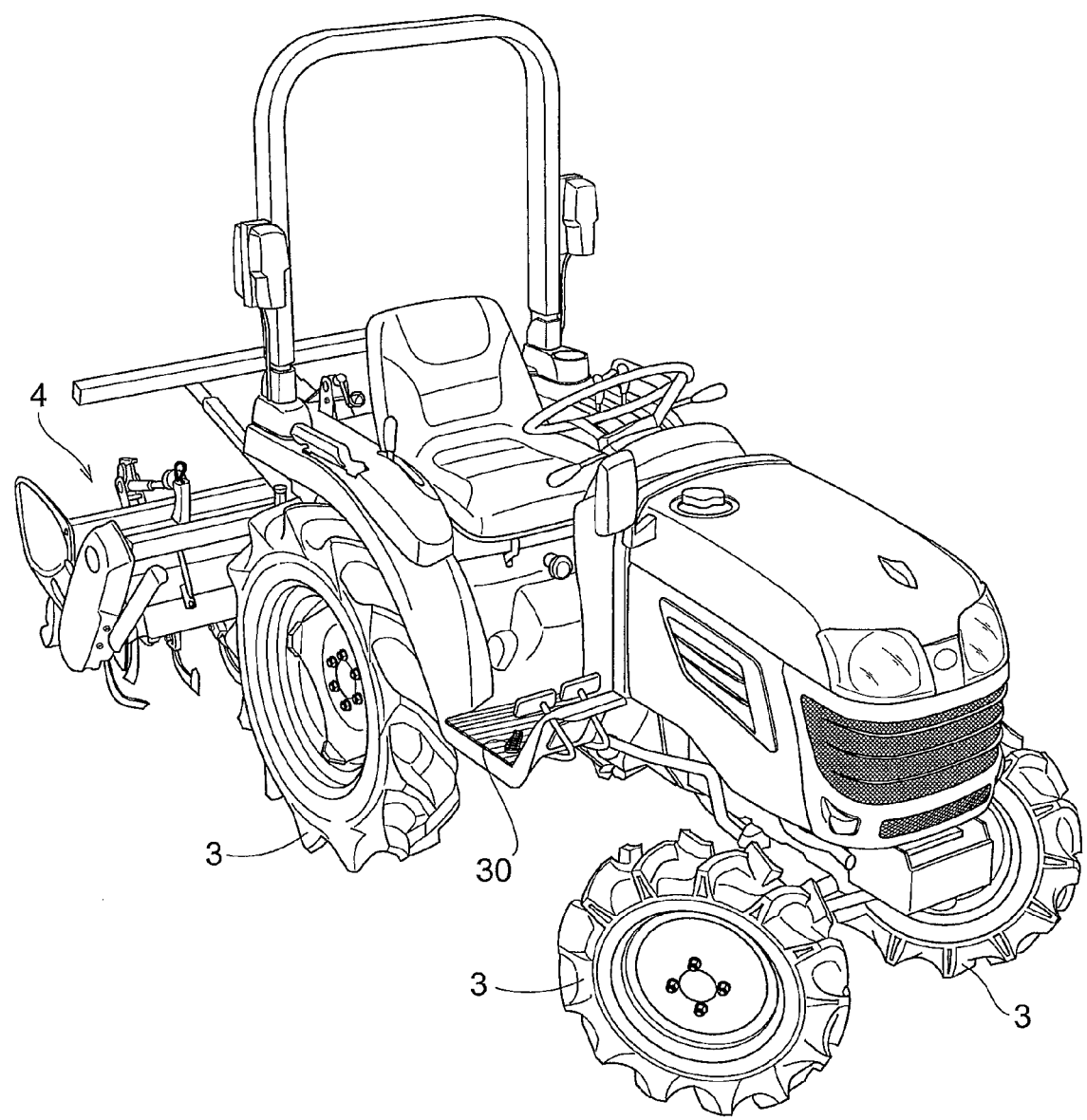
FIG. 3 shows an outer appearance of a tractor which is an example of a utility work vehicle incorporating the inventive speed change control system.
Figure 4:
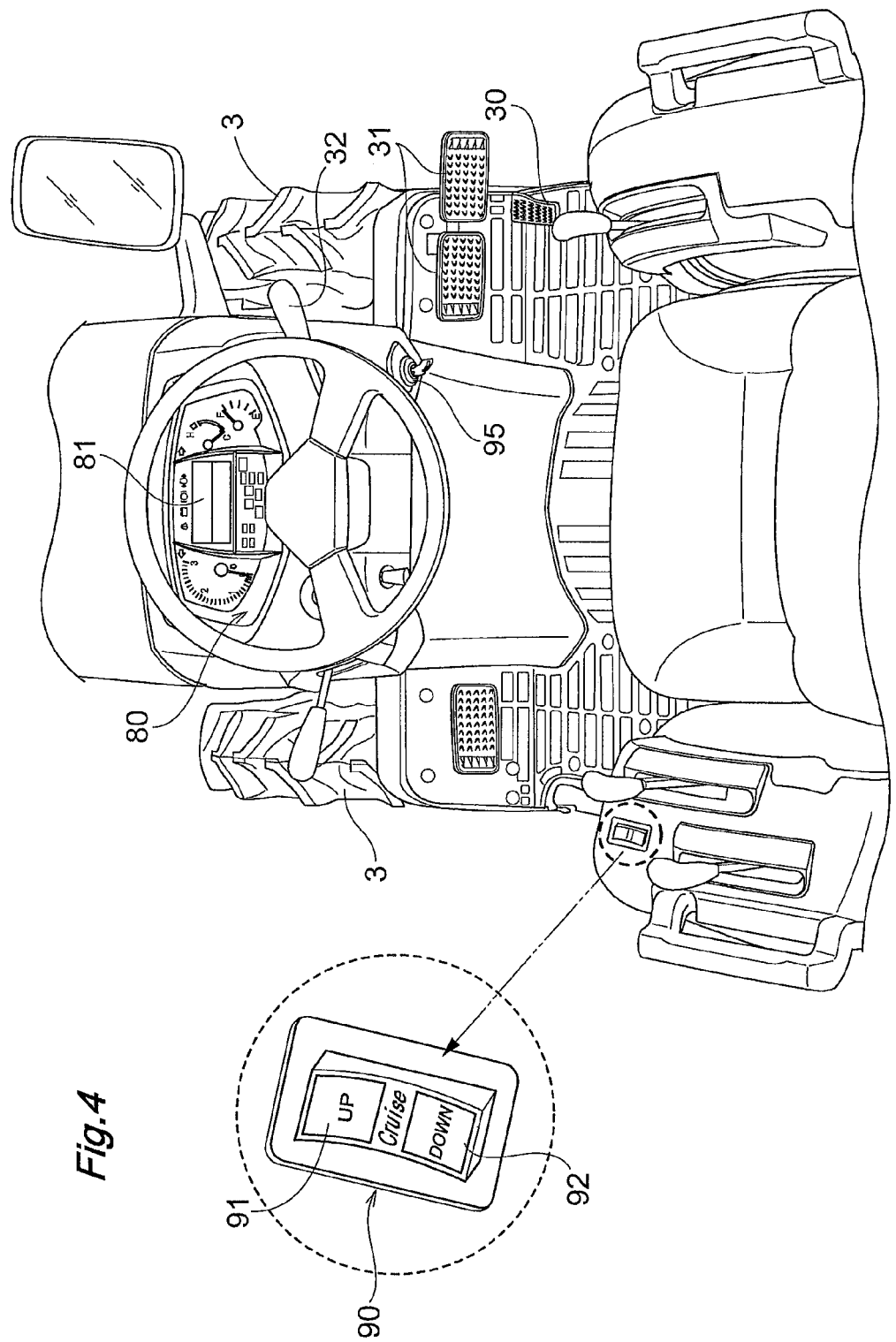
FIG. 4 is a perspective view showing a driving operational section of the tractor in FIG. 3 as seen from the driver's seat.
Figure 5:
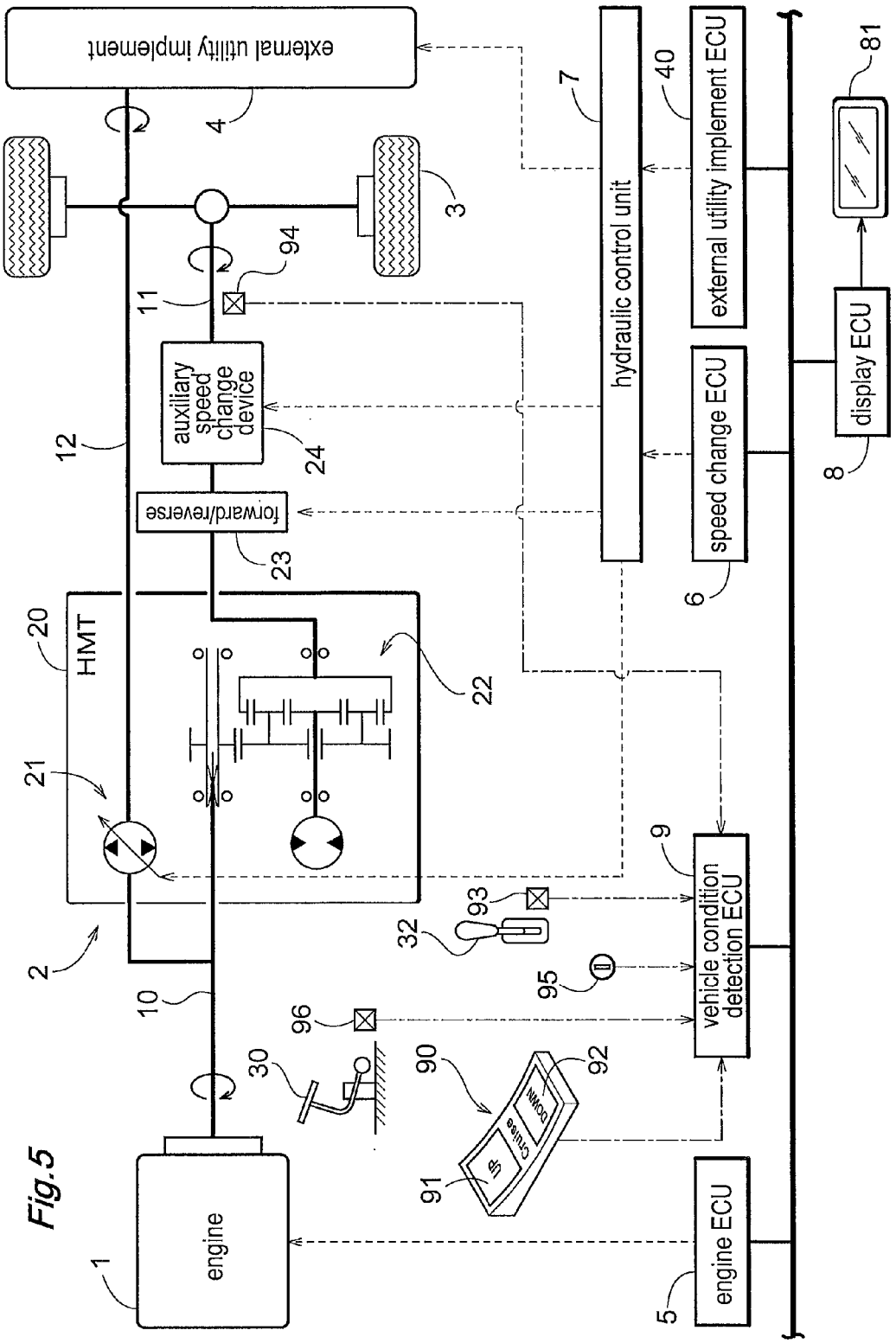
FIG. 5 is a block diagram showing an example each of a power train and a speed change control line of the tractor.

Next, an embodiment of the present invention will be specifically described. In this embodiment, the speed change control system of the present invention is incorporated in a tractor. This tractor employs, a hydraulic mechanical stepless speed change device (HMT) 20 as the stepless speed change device. In this embodiment too, the speed change operational tool is constituted of a speed change pedal 30. And, the constant speed travel operational device is constituted of the constant speed switch 90 described above. FIG. 3 shows an outer appearance of the tractor. FIG. 4 is a perspective view showing a driving operational section of the tractor of FIG. 3 as seen from the driver's seat. FIG. 5 is a block diagram showing an example of a power train and a speed change control line of the tractor.

In this tractor, at a rear portion of the vehicle body supported on drive wheels 3, there is mounted an external utility implement 4 which is provided as a cultivating unit. An engine 1 mounted at a front portion of the vehicle body is a diesel engine 1 whose rotation is controlled by the common rail arrangement. Power of the engine 1 from an output shaft 10 is transmitted through the HMT 20, a forward/reverse switchover device 23 and an auxiliary speed change device 24 which effects speed change in a plurality of steps (two, high and low steps in this embodiment) to a speed change output shaft 11 and eventually rotates the drive wheels (the front wheels and/or the rear wheels) 3. Further, a portion of the power of the engine 1 branched (taken off) from the output shaft 11 of the engine 1 is transmitted through a PTO transmission line 12 to the external utility implement 4 such as the cultivating device mounted on the tractor.

The HMT 20 is constituted of an HST (hydrostatic hydraulic speed change device) 21 comprising a swash plate variable discharge type hydraulic pump which receives the power from the output shaft 10 of the engine 1 and a hydraulic motor which is rotated by a hydraulic pressure from the hydraulic pump and outputs power, and a planetary gear mechanism 22. The planetary gear mechanism 22 is configured to input the power from the output shaft 10 of the engine 1 as well as the power from the hydraulic motor and to feed speed-changed output thereof to the forward/reverse switchover device 23. The HST 21 per se alone can function as the hydraulic stepless speed change device 20.

With this HST 21 in operation, as the power from the engine 1 is inputted to its pump shaft, an amount of pressure oil is supplied from the hydraulic pump to the hydraulic motor, whereby the hydraulic motor is rotatably driven by the hydraulic pressure from the hydraulic pump, thereby to rotatably drive the motor shaft. This rotation of the hydraulic motor is transmitted via the motor shaft to the planetary gear mechanism 22. Further, with the HST 21, by displacing a cylinder operably coupled with the swash plate of the hydraulic pump, the angle of this swash plate is changed, whereby speed change is effected to a forward rotation state, a reverse rotation state, or to a neutral state located between the forward rotation state and the reverse rotation state. Further, whether the speed change is effected to the forward rotation state or to the reverse rotation state, the rotational speed of the hydraulic pump is steplessly changed thereby to steplessly change the rotational speed (the number of rotations per unit time) of the hydraulic motor. As a result, the rotational speed of the power outputted from the hydraulic motor to the planetary gear mechanism 22 is changed steplessly. When the swash plate is positioned at the neutral position, the HST 21 stops rotation of the hydraulic motor by the hydraulic pump, thus eventually stopping the output from the hydraulic motor to the planetary gear mechanism 22.

The planetary gear mechanism 22 includes a sun gear, three planet gears disposed in equidistant distribution around the sun gear, a carrier for rotatably supporting the respective planet gear, a ring gear meshed with the three planet gears and an output shaft 11 coupled to the forward/reverse switchover device 23. Incidentally, in this embodiment, the carrier forms, in its outer perimeter, a gear portion which meshes with an output gear mounted on the output shaft 10 and is rotatably supported to a boss portion of the sun gear.

With the above-described arrangement, this HMT 20 can steplessly speed-change the power transmission to the drive shaft 3 by changing the swash plate angle of the HST 21. This swash plate control is realized by hydraulic control of the hydraulic control unit 7 which is operated based on a control command from the speed change ECU 6. There is also provided a pedal sensor 96 for generating, as a detection signal, an amount of operation (in this case a pivotal angle) which is produced by the driver's stepping on this speed change pedal 30. The pedal sensor 96 includes a potentiometer and the like, for example. Adjacent the speed change pedal 30, there are provided brake pedals 31 for the right and left wheels. Further, in the driver's section, there are provided an accelerator lever 32 for adjusting the engine rotational speed, and a lever sensor 93 for detecting the operational position of the accelerator lever 32 and generating an operational signal.

In this embodiment, as shown in FIG. 4, the seesaw type constant speed switch 90, having the "UP" press operational face 91 and the "DOWN" press operational face 92, is provided on a left side panel which covers the upper side of the rear wheel fender. However, this switch may be provided on the right side panel, a steering wheel or a front panel provided forwardly of the steering wheel.

The control line of this speed change control system is constituted of e.g. the engine ECU (engine control unit) 5, the speed change ECU (speed change control unit) 6, the hydraulic control unit 7, a display ECU 8, a vehicle condition detection ECU 9, an external implement ECU 40, etc. and these are connected via a vehicle-mounted LAN to be capable of data transmission with each other.

The vehicle condition detection ECU 9 inputs signals from the various sensors and operational input signals indicative of conditions of operational instruments operated by the driver, and effects signal conversions or evaluation calculations when needed and outputs the resultant signals or data to the car mounted LAN. Of the signals inputted to this vehicle condition detection ECU 9, those particularly related to the present invention include e.g. an operational position signal from the constant speed switch 90, a signal from the pedal sensor 96 which detects the operational amount of the speed change pedal 30, a signal from a rotation sensor (or vehicle speed sensor) 94 which detects the rotational speed (the number of rotations or revolutions) of the speed change output shaft 11 which can be used also for calculation of the tractor vehicle speed, a signal from the accelerator sensor 93 for detecting the operational amount of the accelerator pedal 32, a signal from the vehicle key switch 95, etc.

The engine ECU 5, as is well-known, is the core functional unit for electronic control of the engine 1. The ECU 5 executes various types of engine control such as a control based on a preset program according to an operational condition of the engine 1 which can be assumed from external operation input signals, internal sensor signals, etc. a constant rotational speed control, a constant torque control and so on. The external implement ECU 40 generates control signals for controlling the external utility implement 4.

Figure 6:
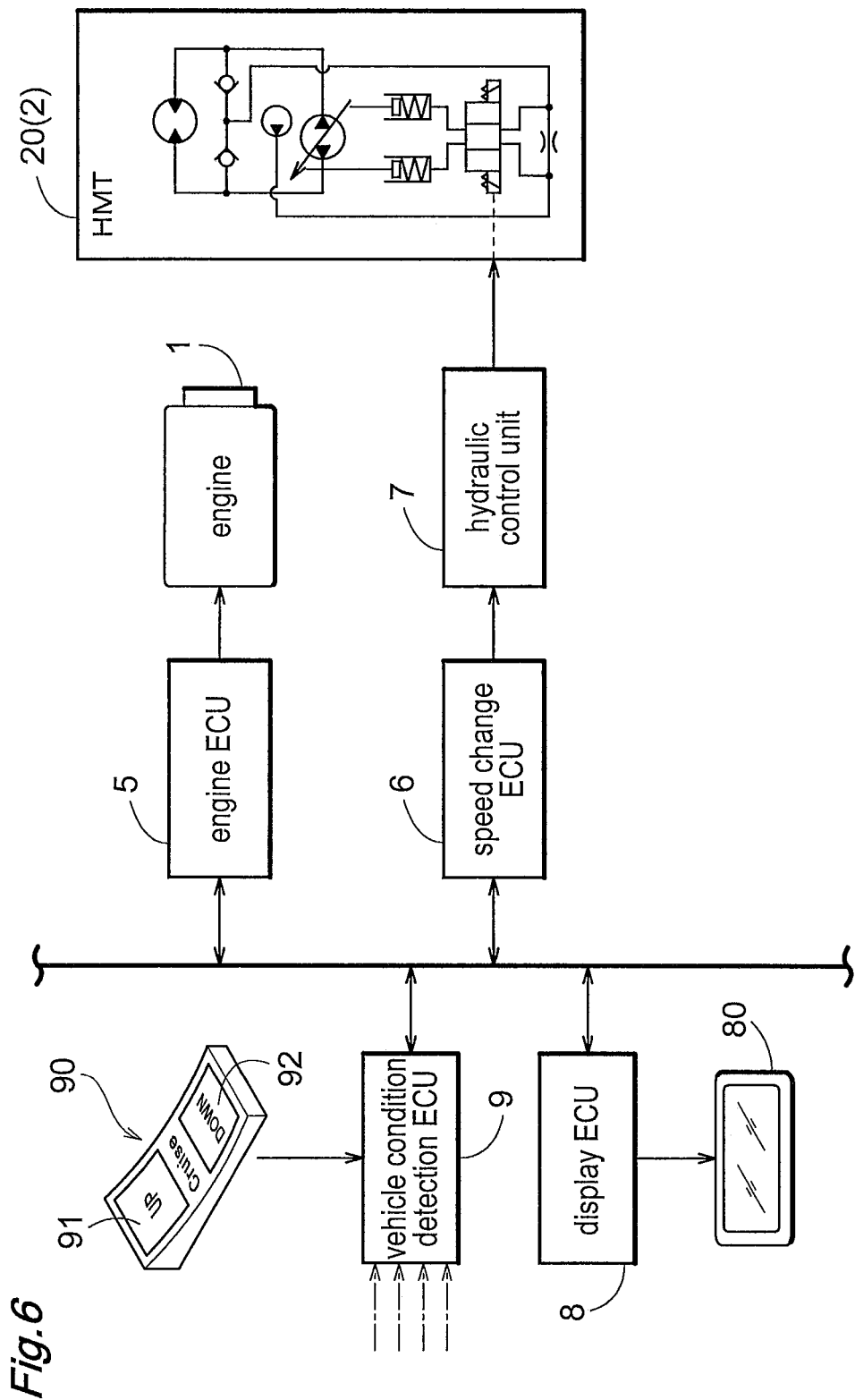
FIG. 6 is a functional block diagram of the speed change control line.
Figure 7:
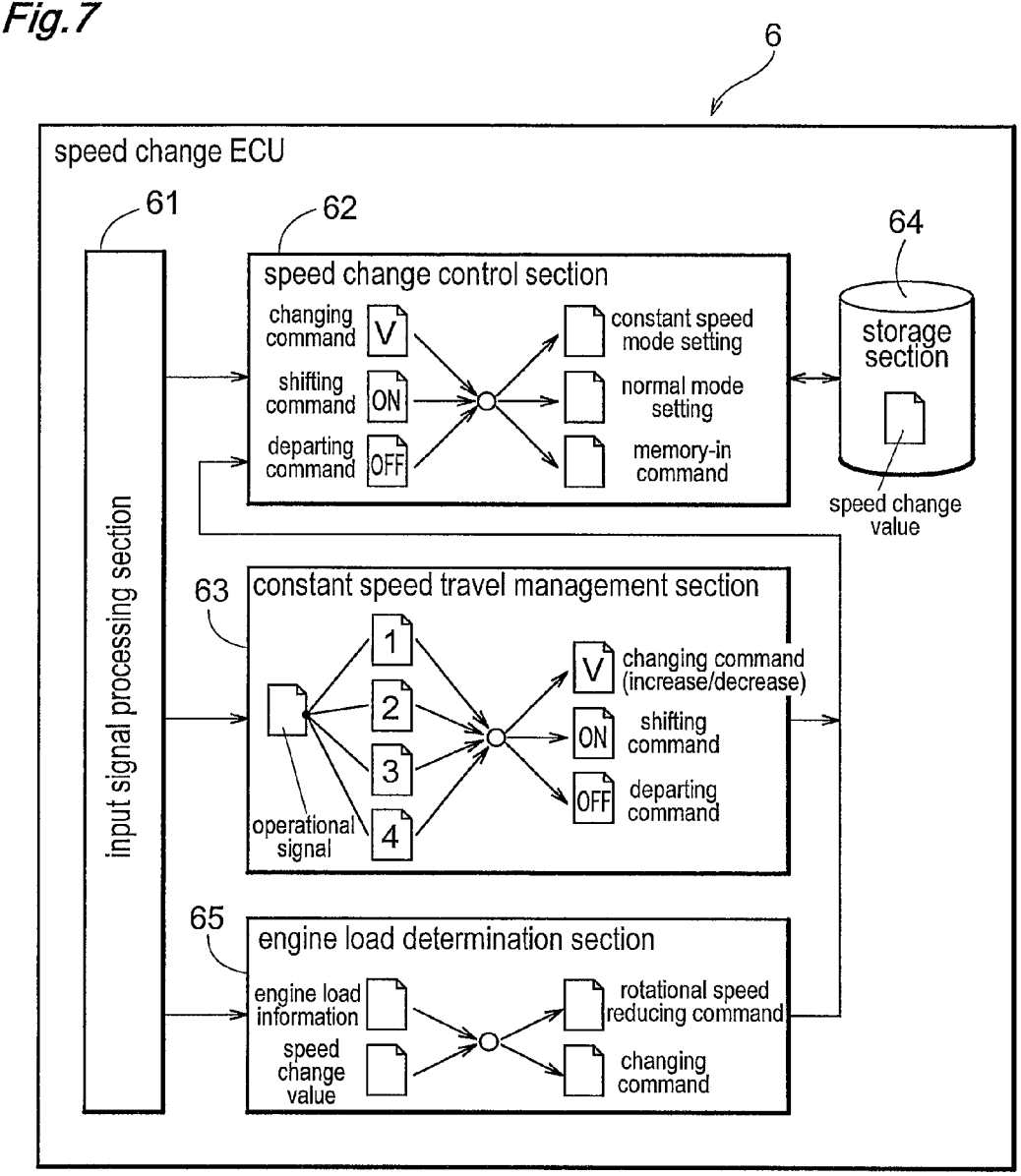
FIG. 7 is a functional block diagram of a speed change ECU.

As shown in FIG. 6 or FIG. 7, the speed change ECU 6 calculates a speed change value for setting the speed change ratio of the HMT 20, based on e.g. the operational amount of the speed change pedal 30, the operational state of the constant speed switch 90, whereby the speed change ratio of the HMT 20 is determined and based on this speed change ratio, the tractor is caused to travel.

As described hereinbefore, the speed change ECU 6 includes the constant speed mode for causing this tractor to travel at a constant speed. To this end, the speed change ECU 6 includes, as described hereinbefore, the input signal processing section 61, the speed change control section 62, the constant speed travel management section 63, the storage section 64, and the engine load determination section 65. The speed change control section 62 generates a swash plate angle control command to be outputted to the hydraulic control unit 7, based on the operational amount of the speed change pedal 30 inputted via the input signal processing section 61. Respecting the constant speed travel, the speed change control section 62 sets the speed change control to the constant speed mode based on the shifting command from the constant speed travel management section 63 and releases the constant speed mode based on the departing command therefrom, thereby to set the speed change control back to the normal mode. Further, the speed change control section 62, based on a changing command for increasing/decreasing the constant speed travel speed which was given from the constant speed travel management section 63, changes the speed change value, and then outputs a swash plate angle control command corresponding to this speed change value to the hydraulic control unit 7, and also this changed speed change value is stored in the storage section 64. The storage section 64 is cleared in response to an ON operation of the vehicle key switch 95. Therefore, when the mode is shifted from the normal mode to the constant speed mode for the first time, the speed change value in the normal mode at this timing is utilized directly as the vehicle speed for the constant speed travel and this speed change value is stored in the storage section 64. However, in the case of departure from the constant speed mode based on a departing command or release of the constant speed mode due to an operation of the speed change pedal 30 or the brake pedal 31, the storage section 64 is not cleared. Therefore, when the mode is shifted to the constant speed mode again, the speed change value currently stored in the storage section 64, that is, the vehicle speed at the time of the previous constant speed travel is reproduced or used again.

The constant speed travel management section 63 evaluates the type of the command, that is, whether the command is a speed increase changing command, a speed reducing changing command, a shifting command or a departing command, based on the operational position information indicated by the operational signal of the constant speed switch 90, that is, the active condition of the first contact, the second contact, the third contact or the fourth contact and gives the result of this evaluation to the speed change control section 62.

When the engine load determination section 65 determines, based on engine load information and the current speed change value sent from the engine ECU 5, that the engine load leaves some spare in the engine power and the speed change value has some room in the swash plate angle displacement to the speed increase direction, the engine load determination section 65 outputs a command for reducing the engine rotational speed by a predetermined amount and for changing the speed change value for compensating for the rotational speed reduction.

As an example, if the energy saving constant speed travel mode is executed, the engine load determination section 65 generates a command for reducing the current rotational speed of the engine by 200 rpm and transmits this command to the engine ECU 5. In doing this, in order to prevent this engine rotational speed reduction due to the rotational speed reducing command from leading to further reduction in the vehicle speed, the engine load determination section 65 obtains a speed change value for compensating for this amount of reduction and generates a changing command based on this obtained speed change value and gives this command to the speed change control unit 61. The engine ECU 8 controls the rotational speed of the engine 1, with using a base engine rotational speed set by the operational position of the accelerator lever 32 as the control target. The above-described rotational speed reducing command is provided for reducing this base engine rotational speed, and such rotational speed reduction can be commanded for a plurality of times as long as there remains some spare in the engine load and the wash plate angle.

Figure 8:
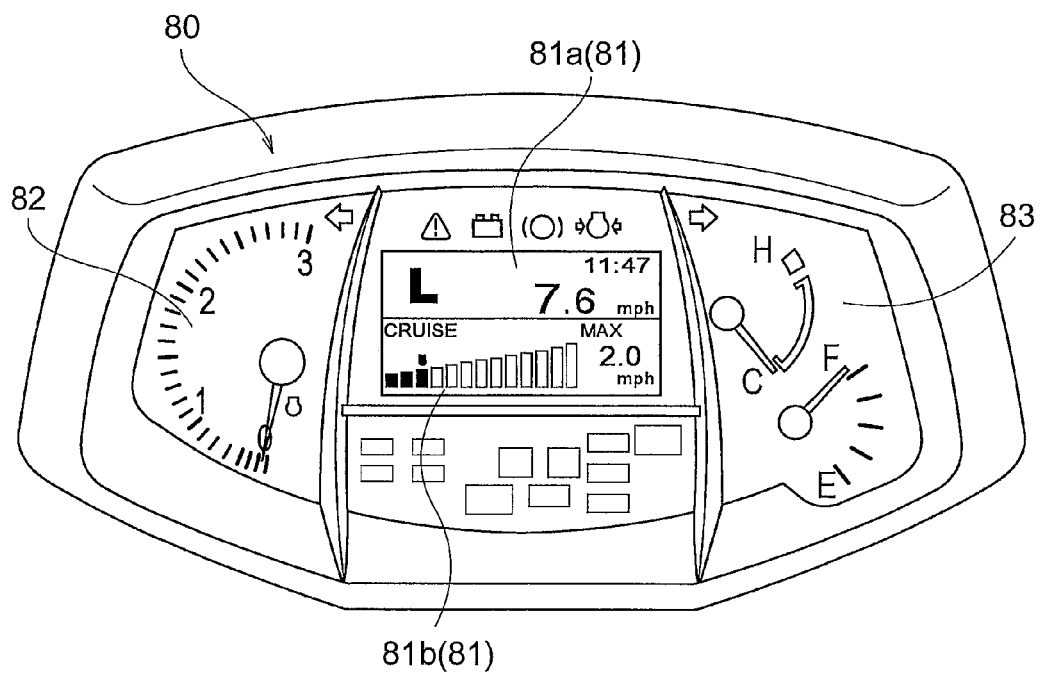
FIG. 8 is a plan view of an instrument panel displaying a constant speed mode state.

The display ECU 8 generates control signals for displaying various kinds of reporting information on e.g. a liquid crystal display section 81 shown in FIG. 8 and incorporated in a meter panel 80 provided in the driving operational area. In the meter panel 80, on the opposed sides of the liquid crystal display section 81, there are disposed a display area 82 for showing the engine rotational speed, a display area 83 for showing a water temperature value, a fuel value, etc. The liquid crystal display section 81 can display various kinds of information according to a display mode. FIG. 8 shows a display state thereof under a constant speed travel display mode as the display mode relating to the present invention. In this constant speed travel display mode, in an upper portion 81*a* of the liquid crystal display section 81, the actual travel speed, the auxiliary speed position (high: H, low: L) are shown, and in a lower portion 81*b* thereof, a travel speed set based on the speed change value set by the constant speed switch 90 is shown in the form a numeric value and a graphic.

Next, transition of speed change control states in the speed change control system having the construction described above will be described with reference to the state transition diagram shown in FIG. 9.

Figure 9:
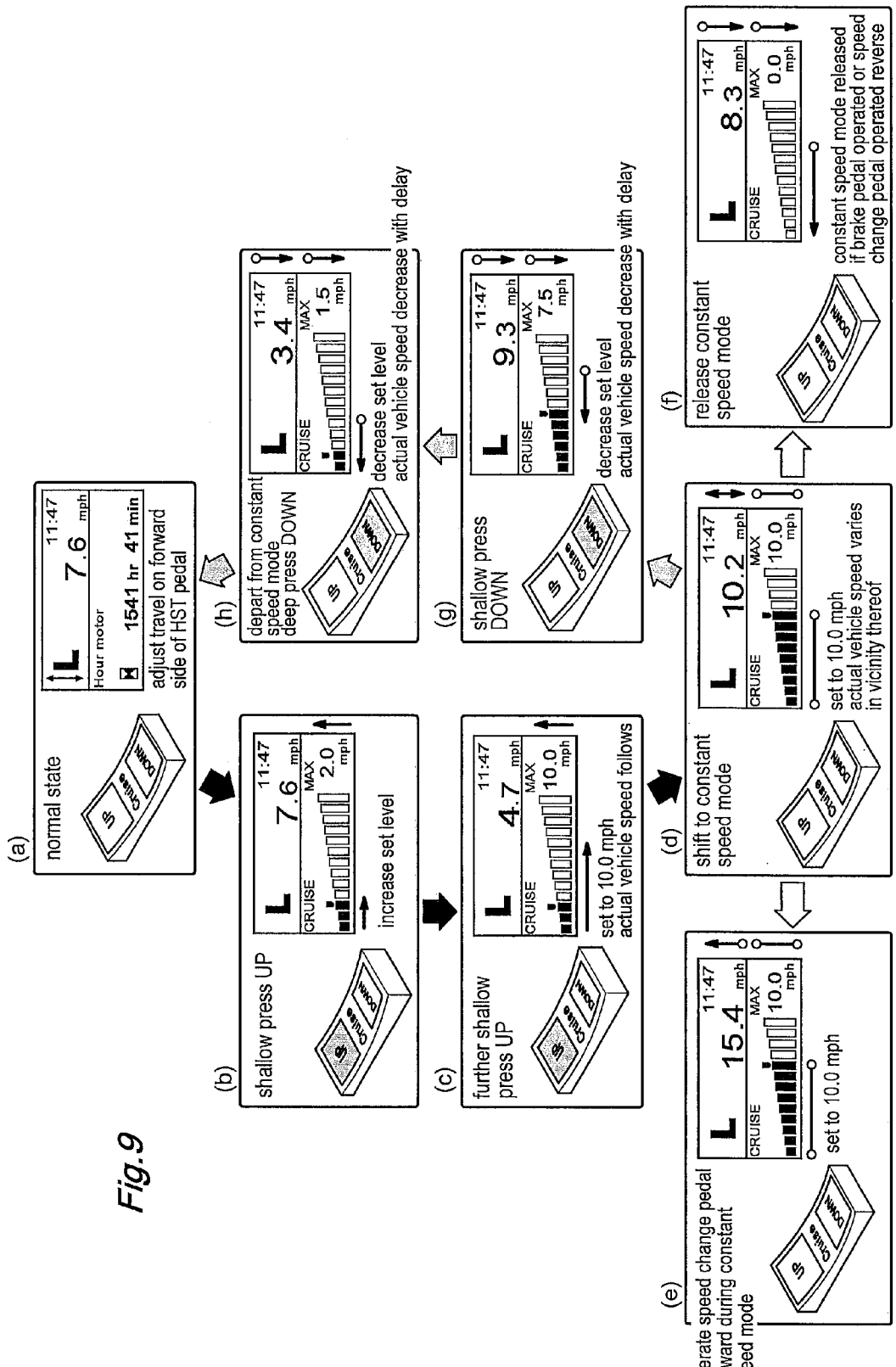
FIG. 9 is a state transition diagram showing transition or shifting of a speed change control state.

FIG. 9 (a) . . . There is shown a speed change state at the time of normal mode as a starting or initial state of this speed change state transition.

FIG. 9 (b) . . . Under the starting state, the UP press operational face 91 of the constant speed switch 90 is pressed shallowly (the press operation for rendering the third contact active). With this operation, the set constant speed travel speed is displayed in the lower portion 81b of the liquid crystal display section 81.

FIG. 9 (c) . . . Further, the shallow press operation of the UP press operational face 91 is repeated to increase the set constant speed travel speed. The actual travel speed will follow the set constant speed travel speed.

FIG. 9 (d) . . . The UP press operational face 91 is pressed deeply (the press operation for rendering the first contact active). With this operation, the normal mode is shifted to the constant speed mode. The actual travel speed will then vary slightly in the vicinity of the set constant speed travel speed and eventually becomes the constant speed travel state.

FIG. 9 (e) . . . When the constant speed pedal 90 is operated in the forward speed increase direction at the time of the constant speed mode, the travel speed is increased forcibly. With this pedal operation, the constant speed mode is automatically released and the mode is shifted back to the normal mode. In this, if the operational amount of the constant speed pedal 30 falls short of the constant speed travel speed, the constant speed mode will be maintained. Further, according to an alternative arrangement, even if the travel speed is increased beyond the constant speed travel speed by an operation of the speed change pedal 30, the mode is returned to the constant speed mode, in response to a returning operation of the constant speed pedal 30.

FIG. 9 (f) . . . If the speed change pedal 30 is operated to the reverse travel side or the brake pedal 31 is stepped on at the time of the constant speed mode, the travel speed is decreased forcibly. With these pedal operations, the constant speed mode is automatically released and the mode is returned to the normal mode.

FIG. 9 (g) . . . At the time of the constant speed mode, the DOWN press operational face 92 of the constant speed switch 90 is pressed shallowly (the press operation for rendering the fourth contact active). With this operation, the set constant speed travel speed is decreased and the actual travel speed will follow this with a delay. By repeating this shallow press operation of the DOWN press operational face 92, the set constant speed travel speed is further reduced and the actual travel speed too will be further reduced.

FIG. 9 (h) . . . At the time of the constant sped mode, the DOWN pres operational face 92 of the constant speed switch 90 is pressed deeply (the press operation for rendering the second contact active). With this operation, the speed change control is departed from the constant speed mode and returned to the normal mode.

Next, a flow of the constant speed mode travel control according to a speed change control system in a further embodiment, which system is modified and further extended from the above-described speed change control system in the foregoing embodiment, will be described with reference to FIGS. 10 through 13.

Figure 10:
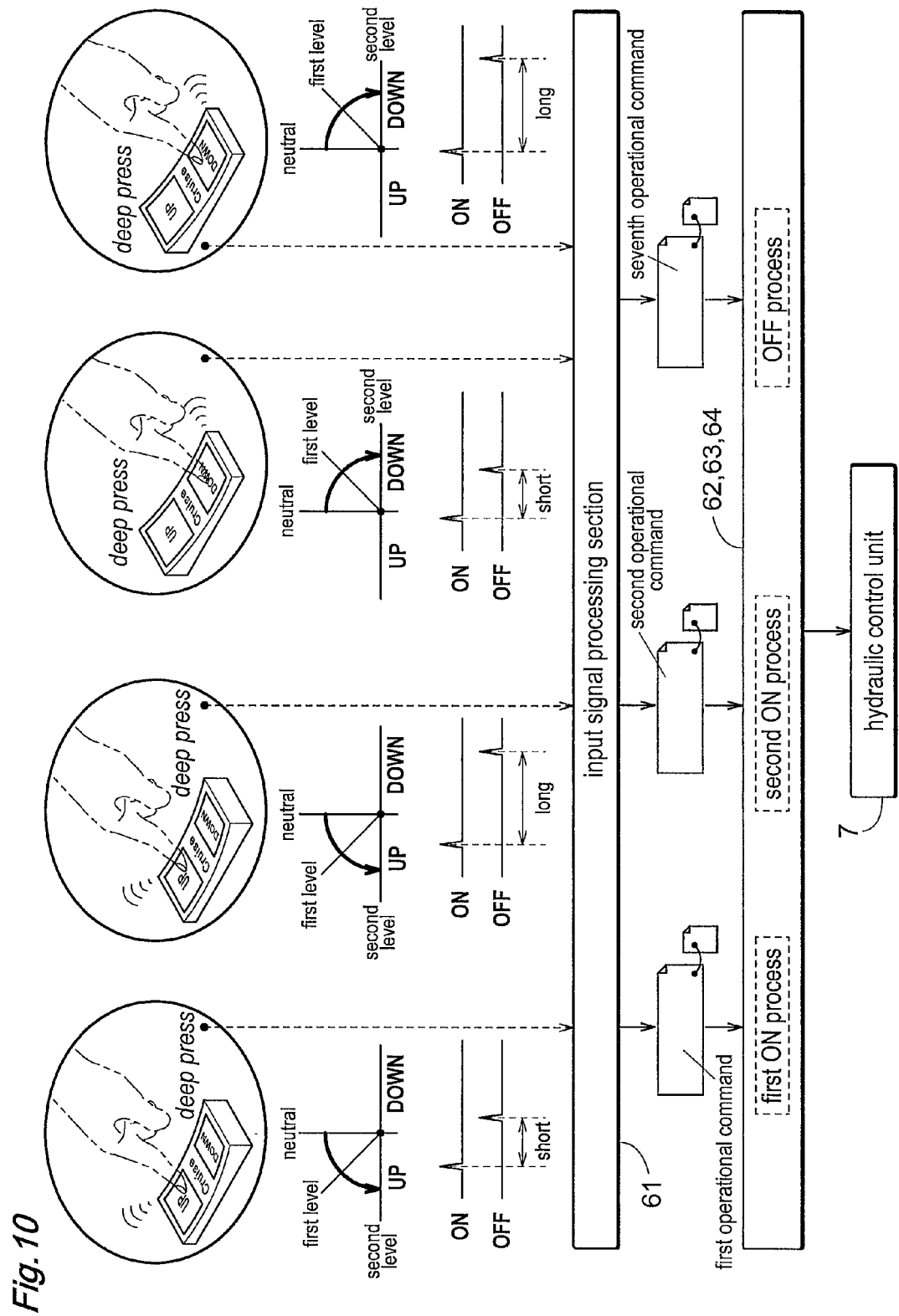
FIG. 10 is a diagram illustrating a control flow of shifting to a constant speed mode travel control according to a further embodiment of the present invention.

In this system, in both pivotal directions of the left (UP) pivotal displacement and the right (DOWN) pivotal displacement of the seesaw type constant speed switch 90 acting as the constant speed travel operational device, operational signals are outputted for indicating individual switch states at the first level (shallow press) and the second level (deep press). Further, each switch state is divided into two states according to the duration of the ON operation of each switch, based on evaluation of the operational signals by the input signal processing section 61. That is, as shown in FIG. 10, there are generated a first operational command with a short period deep press on the UP side, a second operational command with a long period deep press on the UP side, a third operational command with a short period shallow press on the UP, a fourth operational command with a long period shallow press on the UP side, a fifth operational command with a short period shallow press on the DOWN side, a sixth operational command with a long period shallow press on the DOWN side, and a seventh operational command with a long or short period (that is, irrespectively of the ON duration) deep press on the DOWN side.

For each one of the above-described operational commands, in this embodiment, there are assigned control contents relating to constant speed control (called also "cruising" or "cruise travel control"). To the first operational command, there are assigned control contents for shifting to the cruising control (cruise ON) which is a constant speed travel at the current travel vehicle speed. In this, not the vehicle speed per se, but the speed change value providing this vehicle speed is processed. To the second operational command, there are assigned control contents for shifting to the cruising control at a vehicle speed provided by the speed change value (stored speed change value) currently stored in the storage section 64. That is, the first operational command and the second operational command are commands for starting the cruising control. To the third operational command, there are assigned control contents for increasing the current cruising travel speed by a small speed value, e.g. 0.5 to 1 km/h. To the fourth operational command, there are assigned control contents for increasing the current cruising travel speed by a predetermined speed value, e.g. from 2 to 5 kg/h. To the fifth operational command, there are assigned control contents for decreasing the current cruising travel speed by a small speed value, e.g. 0.5 to 1 km/h. To the sixth operational command, there are assigned control contents for decreasing the current cruising travel speed by a predetermined speed value, e.g. from 2 to 5 kg/h. That is, each of the third through sixth operational commands is a speed adjusting command for increasing or decreasing the cruising travel speed. To the seventh operational command, there are assigned control contents for stopping the cruising travel control (cruise OFF) and shifting back to the normal travel wherein the travel speed is adjusted in realtime by the speed change pedal 30 as an example of the speed change operational instrument. That is, the seventh operational command is a shifting command from the cruising travel to the normal travel (i.e. a departing command).

Figure 12:
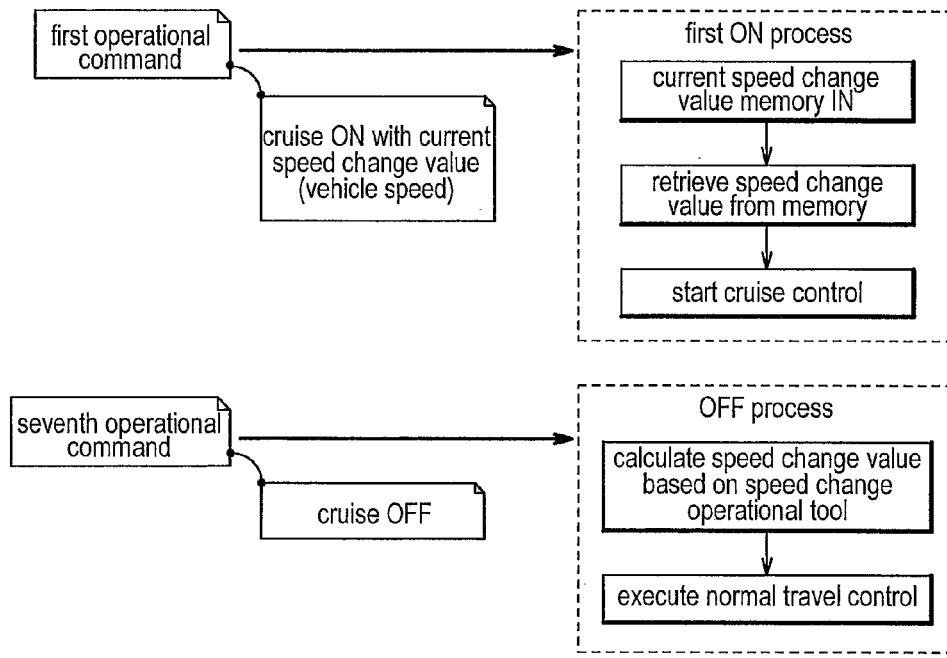
FIG. 12 is a diagram supplementing the flow of the constant speed travel control in FIG. 10.
Figure 13:
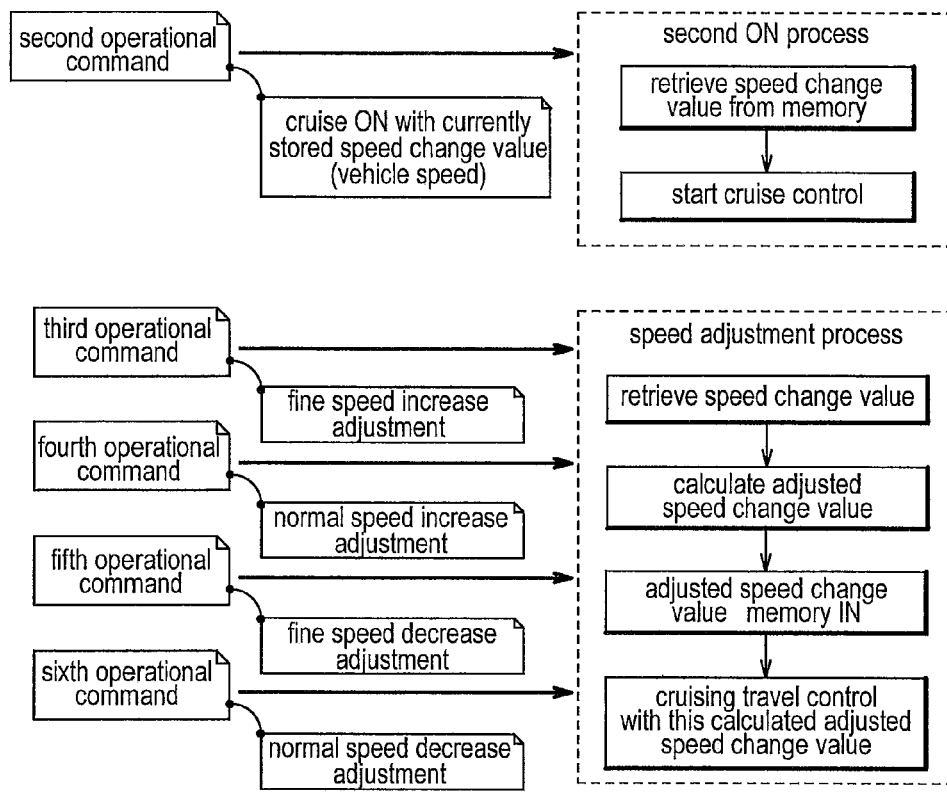
FIG. 13 is a diagram supplementing the flow of the constant speed travel control in FIG. 11.

In response to input of the above-described operational commands, through operations of the speed change control section 62, the constant speed travel management section 63, the storage section 64, etc. provided within the speed change ECU 6, following processes as shown in FIG. 12 and FIG. 13 are effected and control information is outputted to the hydraulic control unit 7. In response to input of the first operational command, a first ON process is executed in which the current speed change value is stored in the storage section 64 (memory IN) and the speed change value is retrieved from the storage section 64 and a cruising travel control with this retrieved speed change value (the currently employed speed change value in this case) is initiated. In response to input of the second operational command, a second ON process is executed in which the previously stored speed change value is retrieved from the storage section 64 and a cruising travel control with this retrieved speed change value is initiated.

In response to input of any one of the fourth through sixth operational commands, a speed adjustment process in the cruising travel is executed in which the speed change value is retrieved from the storage section 64 and an adjusted speed change value is calculated based on speed adjustment information assigned to the operational command. The calculated and adjusted speed change value is stored as a new speed change value in the storage section 64, and then a cruising travel control with this calculated and adjusted speed change value is initiated. In response to input of the seventh operational command, an OFF process is executed in which a speed change value based on the current operational position of the speed change pedal 30 is calculated and a cruising travel control with this calculated speed change value is initiated.

Incidentally, in this modified embodiment, total of eight switch states are created by the four operational positions and ON period evaluation and control contents are assigned to the respective states. However, such mode of assignment is only one example. In the present invention, any other mode of assignment can be employed. And, the mode of creating other switch states too can be freely chosen.

In the foregoing embodiment, when the vehicle key switch is turned ON or the vehicle key switch is turned OFF, the contents of the storage section 64 are cleared. Instead, it may be configured such that the contents of the storage section 64 are not cleared in principle unless being rewritten.

Figure 11:
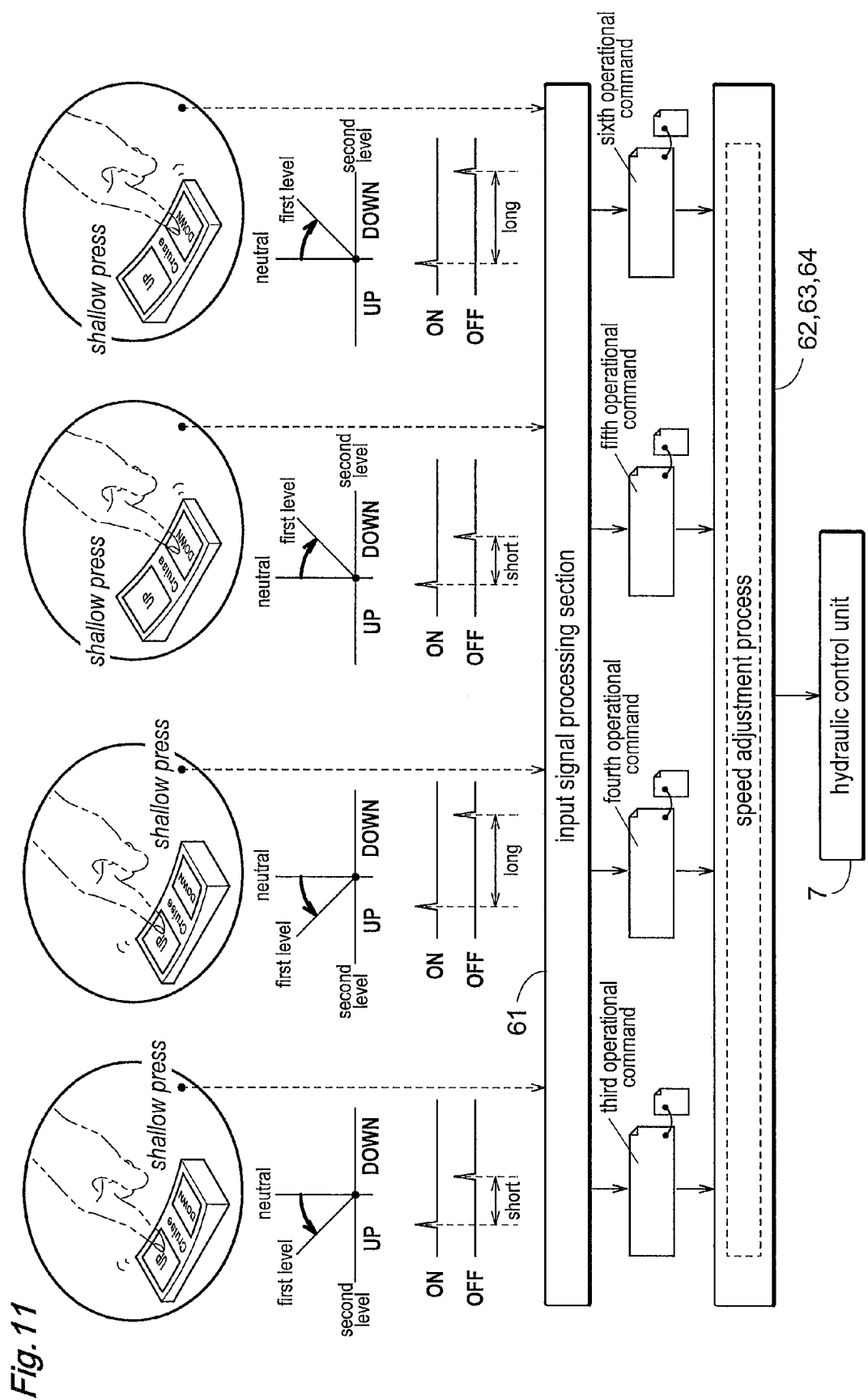
FIG. 11 is a diagram illustrating a control flow of shifting to a constant speed mode travel control according to the further embodiment of the present invention.
Figure 14:
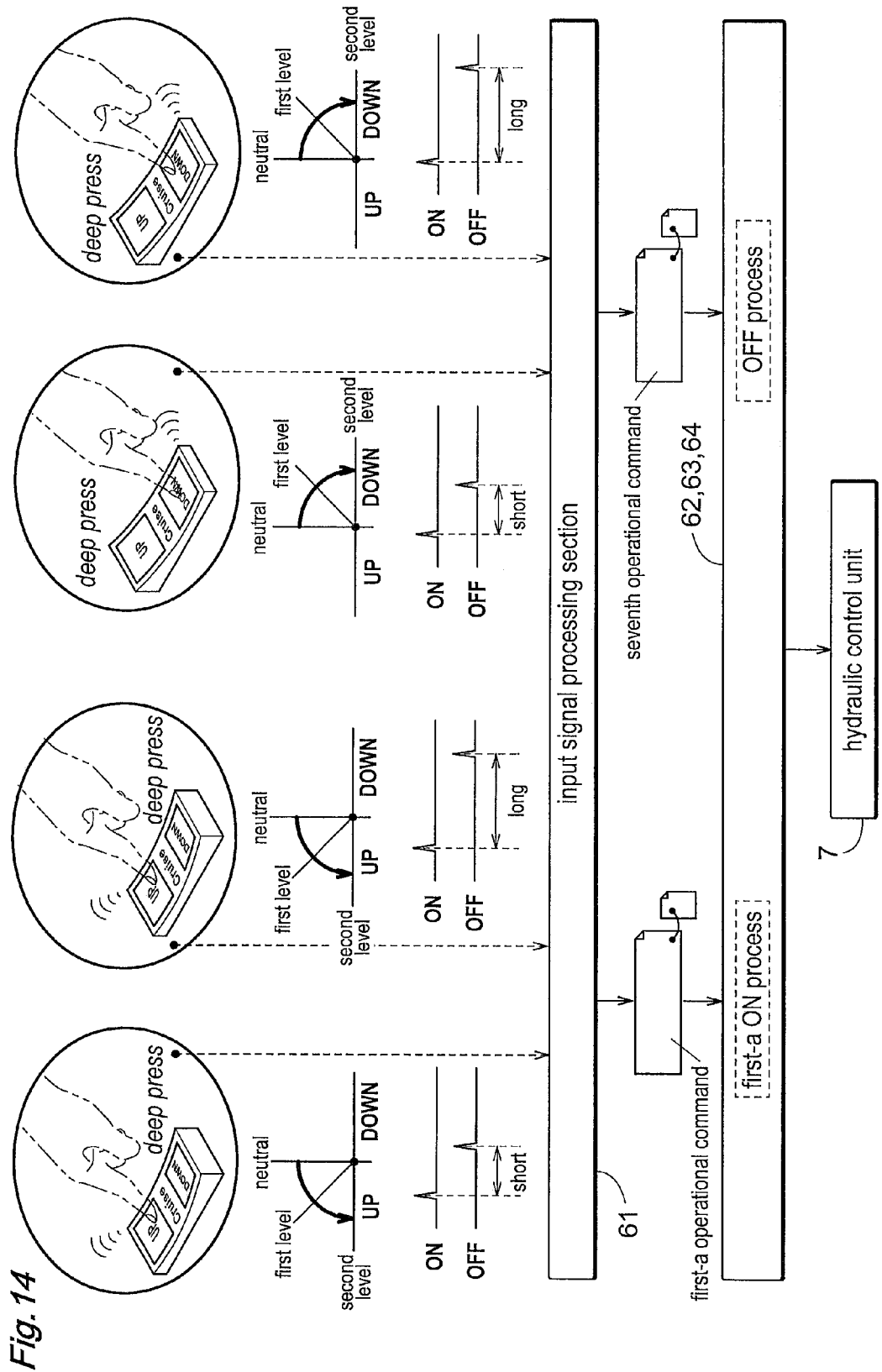
FIG. 14 is a diagram illustrating a control flow of shifting to a constant speed mode travel control according to a still further embodiment of the present invention.
Figure 15:
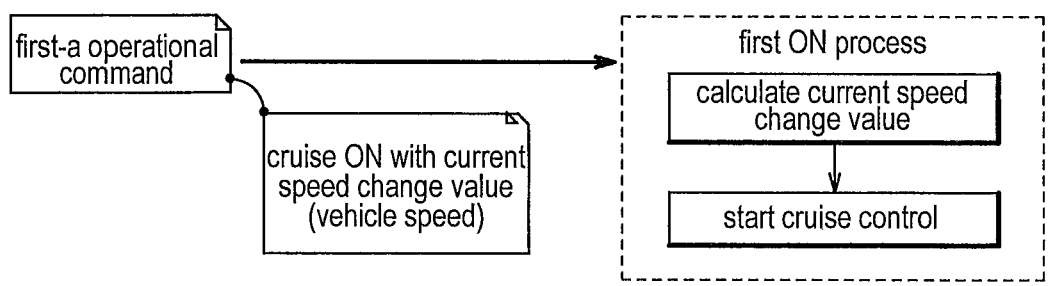
FIG. 15 is a diagram supplementing the flow of the constant speed travel control in FIG. 14.

Next, a speed change control system according to a still further embodiment will be described with reference to FIG. 14 and FIG. 15, which system is constructed by omitting the speed change value storage function from the speed change control system as described above with reference to FIG. 10, FIG. 11, FIG. 12 and FIG. 13. The flow of the constant speed mode travel control executed in this simplified system will be described hereinunder with reference to the diagrams as shown in FIG. 14 and FIG. 15. However, in the following discussion, description of those functions overlapped with the foregoing speed change control systems will be omitted. With a driver's operations of the seesaw type speed change switch 90 acting as the constant speed travel operational device in this system, as illustrated in FIG. 14, with deep press of the UP side for a long period or a short period (that is, regardless of the duration of the ON period), a first-a ("1a") operational command is created. The seventh operational command as well as the third operational command, the fourth operational command, the fifth operational command and the sixth operational commands which are illustrated in FIG. 11, are created similarly, and the processes based upon these commands are effected similarly as well.

The first-a command is a command for initiating the cruising control and the control contents assigned to this first-a command are the contents for shifting to the cruising control (cruise ON) which is the constant speed travel at the currently traveling vehicle speed, that is, the current speed change value. Namely, as the storage section 64 for storing speed change values is omitted in this speed change control system, at the time of shifting from the normal travel to the constant speed travel (cruise travel), the current speed change value is always employed. Therefore, if the travel speed prior to the shifting to the constant speed travel is not the constant speed that the driver desires for the constant speed travel, there will be executed the speed change adjustment process in the cruse travel with using the third operational command, the fourth operational command, the fifth operational command, the sixth operational command as illustrated in FIG. 11.

In the description of the constant speed control (cruising control) in the foregoing embodiments, for the sake of simplicity of description, the presence of the auxiliary speed change device 24 was ignored. However, it is also possible to take the speed change state of this auxiliary speed change device 24 into consideration. For instance, assuming the auxiliary speed change device 24 are provided with three speeds of high, middle and low speeds, the storage section 64 may be configured to store speed change values of the respective auxiliary speeds, so that the constant speed control (cruising control) may be executed for each auxiliary speed.

Other Embodiments (1) In the foregoing embodiments, the seesaw type switch was employed as the constant speed travel operational device. Instead of this, various types of switches, such as a slide switch, a rotary switch, etc., too can be employed as long as such other switches too satisfy the required functions of the present invention.

(2) The respective functional sections of the speed change ECU 6 are described as separate sections for the sake of explanation convenience only. Hence, integration and/or division of these functional sections can be freely made. For instance, the speed change control section 62 and the constant speed travel management section 63 can be integrated together.

(3) In the foregoing embodiments, as the stepless speed change device, an HMT incorporating an HST and an HST was employed. However, the present invention may be applied similarly, even if a CVT (continuously variable transmission) or the like is employed instead.

(4) In the foregoing embodiments, the speed change control system was employed in a tractor as an example of the vehicle. However, the present invention may be applied similarly to other utility work vehicle such as a rice planter, a combine, a grass mower, or to a passenger vehicle or automobile, a truck etc.

As described above, the present invention has an industrial applicability to a speed change system for effecting a constant speed travel (cruise travel) for causing a vehicle to travel at a constant speed.

DESCRIPTION OF REFERENCE NUMERALS/MARKS

1: engine
6: speed change ECU
20: hydraulic stepless speed change device (stepless speed change device)
21: HST
30: speed change pedal (speed change operational instrument)
61: input signal processing section
62: speed change control section
63: constant speed travel management section
64: storage section
65: engine load determination section
90: constant speed switch (constant speed travel operational instrument, constant speed travel operational device)
95: vehicle key switch

What is claimed is:
1. A speed change control system having a constant speed mode for causing a vehicle to travel at a constant speed, comprising:

a stepless speed change device for steplessly speed-changing a rotational power from an engine and outputting the speed-changed power;

a speed change control section for setting a speed change value of the stepless speed change device;

a speed change operational tool for providing the speed change control section with a speed change command;

a constant speed travel management section for causing the speed change control section to execute the constant speed mode; and a constant speed travel operational device for providing the speed change control section with, as operational commands relating to the constant speed mode, a first operational command for shifting to the constant speed mode with using a current speed change value by the speed change operational tool as a constant speed mode speed change value, and a departing command for departing from the constant speed mode, wherein the constant speed travel operational device provides the speed change control section with:
 a third command for executing fine speed increase adjustment of the constant speed mode speed change value;
 a fourth command for executing normal speed increase adjustment which provides a greater speed increase than the fine speed increase adjustment;
 a fifth command for executing fine speed decrease adjustment of the constant speed mode speed change value; and
 a sixth command for executing normal speed decrease adjustment which provides a greater speed decrease than the fine speed decrease adjustment.

2. A speed change control system according to claim claim 1, wherein
the constant speed travel operational device is constituted of a single constant speed travel operational instrument that allows evaluation of at least six distinct operational states.

3. A speed change control system according to claim 2, wherein
the constant speed travel operational instrument has four operational switch positions, and
wherein at least two levels of operational period are evaluated at each one of the operational switch positions.

4. A speed change control system according to claim 3, wherein
the constant speed travel operational instrument comprises a seesaw type switch which provides two levels of operational positions in one direction, and further two levels of operational positions in the other direction, across and relative to a neutral position as a reference point to which the instrument is urgedly maintained.

5. A speed change control system having a constant speed mode for causing a vehicle to travel at a constant speed, comprising:

a stepless speed change device for steplessly speed-changing a rotational power from an engine and outputting the speed-changed power;

a speed change control section for setting a speed change value of the stepless speed change device;

a speed change operational tool for providing the speed change control section with a speed change command;

a constant speed travel management section for causing the speed change control section to execute the constant speed mode; and a constant speed travel operational device for providing the speed change control section with, as operational commands relating to the constant speed mode, a changing command for changing a constant speed mode speed change value which is a speed change value at the time of the constant speed mode, a first operational command for shifting to the constant speed mode with using a current speed change value by the speed change operational tool as the constant speed mode speed change value, and a departing command for departing from the constant speed mode, wherein the constant speed travel operational device is constituted of a single constant speed travel operational instrument, and the constant speed travel operational instrument has a changing operational position for providing the speed change control section with the changing command by a predetermined speed change value unit, a shifting operational position for providing the speed change control section with the first operational command, and a departing operational position for providing the speed change control section with the departing command; and wherein the constant speed travel operational instrument is capable of operational displacements in one direction and in the other direction, across and relative to a neutral position as a reference point to which the instrument is urgedly maintained, a terminal end operational displacement position in the one direction is the shifting operational position, a terminal end operational displacement position in the other direction is the departing operational position, and a unit operational displacement position to the terminal operational displacement positions in the one direction and the other direction is the changing operational position.

* * * * *

UNITED STATES PATENT AND TRADEMARK OFFICE
CERTIFICATE OF CORRECTION

PATENT NO. : 8,676,467 B2  
APPLICATION NO. : 13/421158  
DATED : March 18, 2014  
INVENTOR(S) : Hiroo Fujimoto et al.

Page 1 of 1

It is certified that error appears in the above-identified patent and that said Letters Patent is hereby corrected as shown below:

In the Claims:

Column 17, Line 34, Claim 2, delete "claim claim" and insert -- claim --

Signed and Sealed this
Eighth Day of July, 2014

Michelle K. Lee
*Deputy Director of the United States Patent and Trademark Office*